(12) United States Patent
Lee et al.

(10) Patent No.: US 8,925,988 B2
(45) Date of Patent: Jan. 6, 2015

(54) CONNECTING DEVICE OF DOOR TRIM AND PULL HANDLE FOR VEHICLE

(71) Applicants: Hyundai Motor Company, Seoul (KR); Kia Motors Corporation, Seoul (KR)

(72) Inventors: Jong Ho Lee, Gunpo-si (KR); Jae Ho Choi, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/871,632

(22) Filed: Apr. 26, 2013

(65) Prior Publication Data

US 2014/0215769 A1    Aug. 7, 2014

(30) Foreign Application Priority Data

Feb. 6, 2013    (KR) .................. 10-2013-0013271

(51) Int. Cl.
 *B60J 5/00* (2006.01)
 *B60R 13/02* (2006.01)
 *B60R 21/055* (2006.01)

(52) U.S. Cl.
 CPC ........... *B60R 13/0206* (2013.01); *B60R 21/055* (2013.01); *B60R 13/0243* (2013.01)
 USPC ...................................... 296/1.02; 296/146.7

(58) Field of Classification Search
 USPC .............. 296/146.7, 1.08, 1.09, 187.05, 1.02, 296/153; 188/371, 376, 377; 49/502
 See application file for complete search history.

(56) References Cited

U.S. PATENT DOCUMENTS 7,419,206 B2 *    9/2008    Slobodecki et al. ......... 296/97.9

FOREIGN PATENT DOCUMENTS

| KR | 10-0279572 | 3/2001 |
| KR | 10-0862476 B1 | 10/2008 |
| KR | 10-0870826 | 11/2008 |
| KR | 10-2011-0135654 A | 12/2011 |
| KR | 10-111891281 | 2/2012 |

OTHER PUBLICATIONS

Korean Office Action issued in Korean Application No. 10-2013-0013271 dated Feb. 14, 2014.

* cited by examiner

*Primary Examiner* — Joseph D Pape
*Assistant Examiner* — Dana Ivey
(74) *Attorney, Agent, or Firm* — McDermott Will & Emery LLP

(57) ABSTRACT

A connecting device of a door trim and a pull handle for a vehicle includes a sliding back prevention boss which protrudes from the door trim of the vehicle and a supporting boss which protrudes from the pull handle mounted on the door trim and inserted into the sliding back prevention boss. As such, a phenomenon in which sharp edges are generated due to a broadside collision of a vehicle may be prevented and collision energy due to the collision may be decreased, thereby making it possible to improve salability and safety for a passenger.

5 Claims, 5 Drawing Sheets

CONNECTING DEVICE OF DOOR TRIM AND PULL HANDLE FOR VEHICLE

CROSS-REFERENCE TO RELATED APPLICATION

This application is based on and claims priority from Korean Patent Application No. 10-2013-0013271, filed on Feb. 6, 2013 in the Korean Intellectual Property Office, the disclosure of which is incorporated herein in its entirety by reference.

BACKGROUND

1. Field

The present disclosure relates to a connecting device of a door trim and a pull handle for a vehicle, and more particularly, to a connecting device of a door trim and a pull handle for a vehicle capable of minimizing damage to a passenger by decreasing collision energy and preventing a generation of sharp edges at the time of a broadside collision of a vehicle.

2. Background

As is shown in FIG. 1, a door for a vehicle performing an open or close operation by being hinge-coupled to a body in order for a passenger to get in/out the vehicle is generally provided with an armrest 10 on which the passenger may mount his arm. The armrest 10 is provided with a pull handle 20 on which the passenger may grasp a handhold in a vehicle interior while opening and closing the door.

As shown in a cross-sectional view in FIG. 1, the pull handle 20 has a shape in which a top surface thereof is opened, wherein a front 21 arranged toward an interior side, which corresponds to a grip part contacting a hand of a user, has a boss 21a integrally formed to protrude toward the interior side.

The boss 21a may be inserted and coupled into a boss joint protrusion 31a included in a lower trim 31, such that an upper end of the front 21 and the armrest 10 come in contact to thereby be connected to each other.

In addition, a bottom surface 22 extended from the front 21 has a mounting protrusion 22a formed integrally therewith at a lower side thereof, such that it is coupled to a pull handle bracket 33 through a fixing member 32 such as a screw.

Here, an end of the bottom surface 22 toward an outside side has a structure in which the end is coupled to a lower end of a center trim 34. In addition, the pull handle bracket 33 is jointed to an inner panel 36 of the door through coupling members 35.

Meanwhile, the lower trim 31 and the center trim 34 are components configuring a door trim. Since the above-mentioned pull handle 20 has a structure in which the boss 21a is inserted into a hole of the boss coupling protrusion 31a and thereby coupled with the lower trim 31, coupling force between the pull handle 20 and the lower trim 31 is large.

Therefore, when the passenger grabs the front 21 of the pull handle 20 with his hand, a shaking phenomenon of the pull handle 20 may be removed, and when a part of a body such as a knee of the passenger applies pressure to the lower trim 31, a shaking phenomenon of the lower trim 31 may be removed, thereby making it possible to improve customer satisfaction.

However, according to the related art, the above-mentioned strong coupling force between the boss 21a and the boss coupling protrusion 31a transfers collision energy generated at the time of a broadside collision accident to the passenger side because it does not absorb the collision energy. Thus, at the time of the collision, sharp edges having a sharp shape are generated to thereby increase damage to the passenger.

SUMMARY

Accordingly, the present disclosure has been made to solve the above-mentioned problems occurring in the prior art while advantages achieved by the prior art are maintained intact.

In one embodiment of the present disclosure, there is provided a connecting device of a door trim and a pull handle for a vehicle, and more particularly, a connecting device of a door trim and a pull handle for a vehicle capable of minimizing damage to a passenger by decreasing collision energy and preventing a generation of sharp edges at the time of colliding a broadside of the vehicle.

In one example of the present disclosure, there is provided a connecting device of a door trim and a pull handle for a vehicle, the connecting device including: a sliding back prevention boss configured to protrude from the door trim of the vehicle; and a supporting boss configured to protrude from the pull handle mounted on the door trim and insert into the sliding back prevention boss. A guide groove is formed at a lower end of the sliding back prevention boss and a guide rib corresponding to the guide groove is formed at a lower end of the supporting boss.

The sliding back prevention boss may have a semi-cylindrical shape and the supporting boss may have a cylindrical shape having a diameter smaller than that of a diameter of the sliding back prevention boss.

The sliding back prevention boss may have a side part formed to have a gradient of a predetermined height in a direction toward an interior side of the vehicle.

A side of the sliding back prevention boss may have a first supporting rib protruding radially in an outward direction from the sliding back prevention boss, and a side of the supporting boss may have a second supporting rib protruding radially in an outward direction from the supporting boss.

The guide rib of the supporting boss may have a curved shape.

A lower part of the supporting boss may be provided with a collision absorbing hole.

The collision absorbing hole may have a cross-section formed in a quadrangle structure.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

An embodiment of the present disclosure will be described in detail with reference to the accompanying drawings.

A connecting device of a door trim and a pull handle for a vehicle according to an embodiment of the present disclosure includes a sliding back prevention boss 110 formed at the door trim 100 of the vehicle and a supporting boss 210 formed at the pull handle 200 mounted on the door trim 100, as shown in FIGS. 2 to 5.

Figure 1:
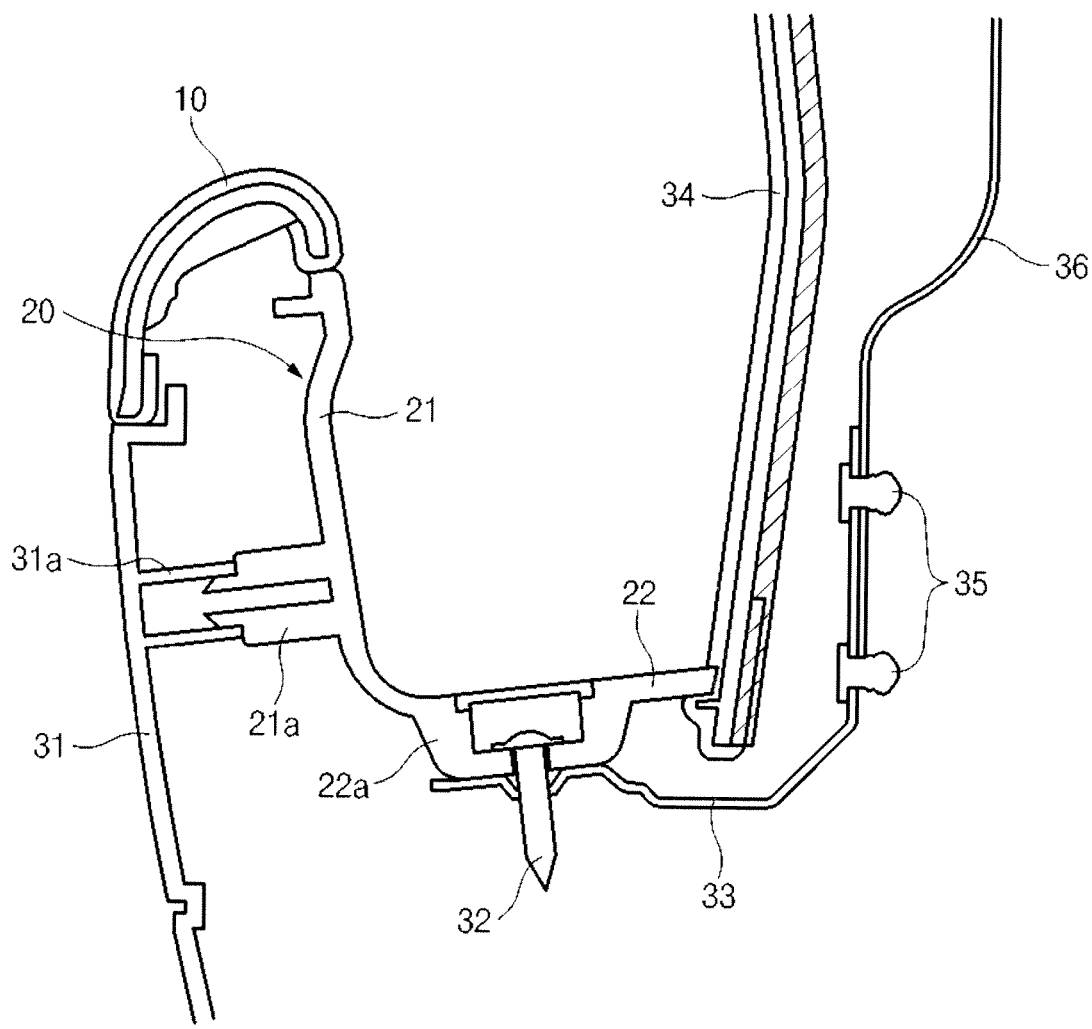
FIG. 1 is a diagram showing a connecting device of a door trim and a pull handle for a vehicle according to the related art.
Figure 2:
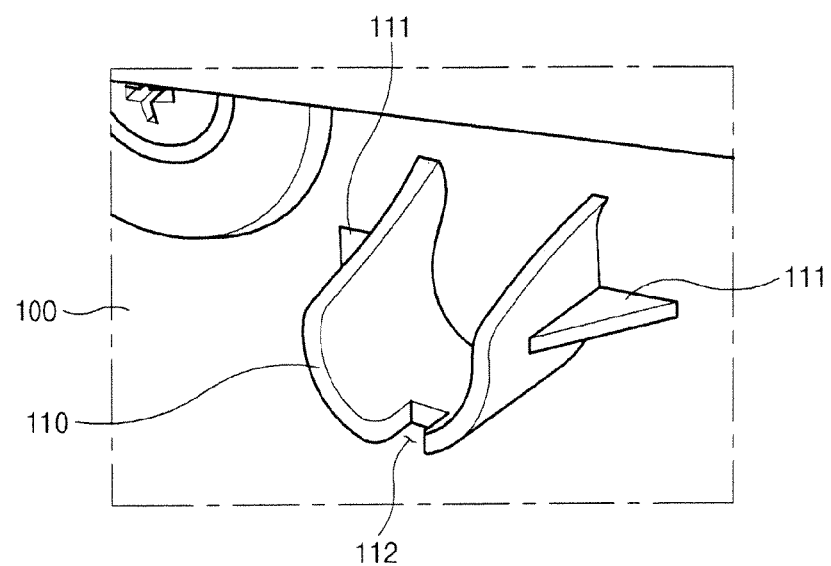
FIG. 2 is a diagram showing a sliding back prevention boss formed at a door trim for use in a connecting device of a door trim and a pull handle for a vehicle according to an embodiment of the present disclosure.

As shown in FIG. 2, the sliding back prevention boss 110 protrudes from the door trim 100 to prevent a phenomenon in which the pull handle 200 is slid back into an interior of the vehicle at the time of a broadside collision of the vehicle.

In this case, the sliding back prevention boss 110 has a semi-cylindrical shape to support the door trim 100 and the pull handle 200, thereby making it possible to prevent a sliding back of the pull handle 200 at the time of the collision.

Figure 3:
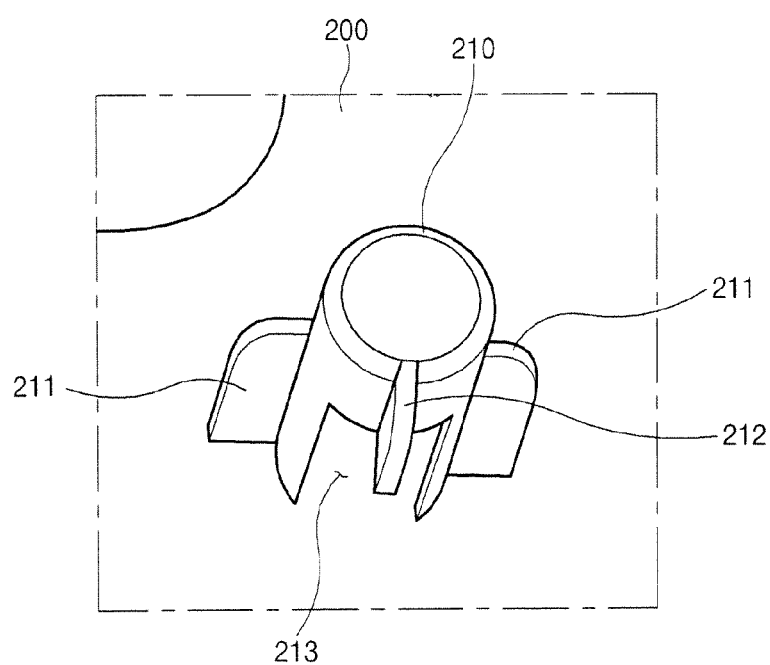
FIG. 3 is a diagram showing a supporting boss formed at a pull handle for use in the connecting device of the door trim and the pull handle for the vehicle according to an embodiment of the present disclosure.

As shown in FIG. 3, a supporting boss 210 which is formed to be protruded from the pull handle 200, is inserted into the sliding back prevention boss 110 formed at the door trim 100.

Meanwhile, the pull handle 200 is basically mounted on the door trim 100.

Figure 4:
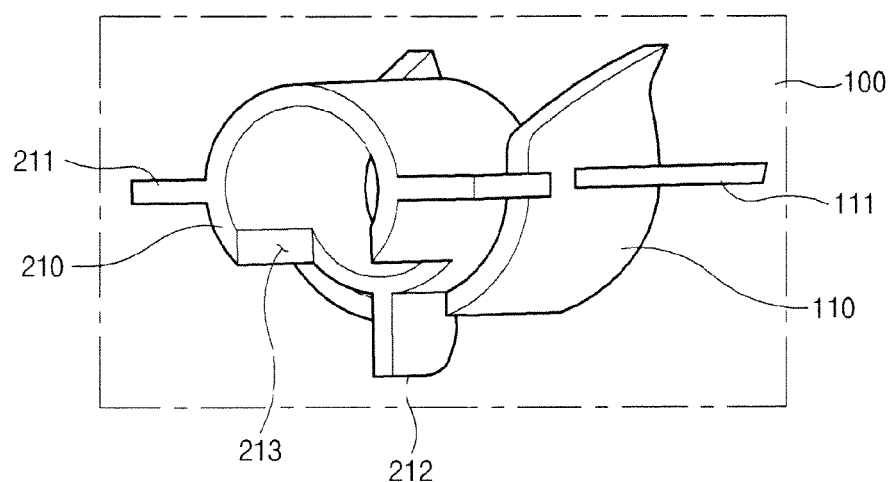
FIG. 4 is a diagram showing a coupling state between the sliding back prevention boss of FIG. 2, and the supporting boss of FIG. 3 in the connecting device of the door trim and the pull handle for the vehicle according to an embodiment of the present disclosure.

As shown in FIGS. 2 to 4, the supporting boss 210 may have a cylindrical shape having a diameter smaller than a diameter of the sliding back prevention boss 110, thereby making it possible for the supporting boss 210 to be inserted into the sliding back prevention boss 110.

In this case, a length of the supporting boss 210 is sufficiently longer than that of the sliding back boss 110, such that supporting force of the pull handle 200 obtained by the supporting boss 210 may be improved at the time of the collision.

In addition, the sliding back prevention boss 110 has a side part having a gradient of a predetermined height in a direction toward the interior side of the vehicle, such that the side part absorbs impact when the supporting boss 210 of the pull handle 200 part intrudes in the interior side of the vehicle due to the collision generation, thereby making it possible to decrease collision energy and minimize deformation.

In addition, a side of the sliding back prevention boss 110 has a first supporting rib 111 formed to protrude radially in an outward direction from the sliding back prevention boss, thereby making it possible to improve supporting force.

In this case, one end of the first supporting rib 111 is mounted on the door trim 100 and the other end connected vertically thereto is mounted on the sliding back prevention boss 110, such that the sliding back prevention boss 110 and the door trim 100 are connected to each other through the first supporting rib 111, thereby making it possible to improve the supporting force of a sliding back prevention member.

In addition, a side of the supporting boss 210 has a second supporting rib 211 formed to be protruded radially in an outward direction from the supporting boss, thereby making it possible to improve the supporting force of the pull handle 200.

Each of the first supporting rib 111 and the second supporting rib 112 may be provided in a pair.

As is shown in FIG. 3, one end of the second supporting rib 211 is mounted on the pull handle 200 and another end having an edge perpendicular to the end mounted to the pull handle 200 is mounted on the supporting boss 210, such that the supporting boss 210 and the pull handle 200 are connected to each other through the second supporting rib 211, thereby making it possible to improve the supporting force of the supporting boss 210.

In addition, a guide groove 112 is formed at a lower end of the sliding back prevention boss 110 and a guide rib 212 corresponding to the guide groove 112 is formed at a lower end of the supporting boss 210, thereby preventing separation of the supporting boss 210 from the sliding back prevention boss by a broadside collision when the supporting boss 210 is inserted into the sliding back prevention boss 110.

In this configuration, a front part of the guide rib 212 may have a curved shape.

Meanwhile, a collision absorbing hole 213 is formed at a lower part of the supporting boss 210, such that impact may be decreased at the supporting boss 210 by a space formed by the collision absorbing hole 213 at the time of the collision.

In this configuration, the collision absorbing hole 213 may have a quadrangular cross-section.

Figure 5:
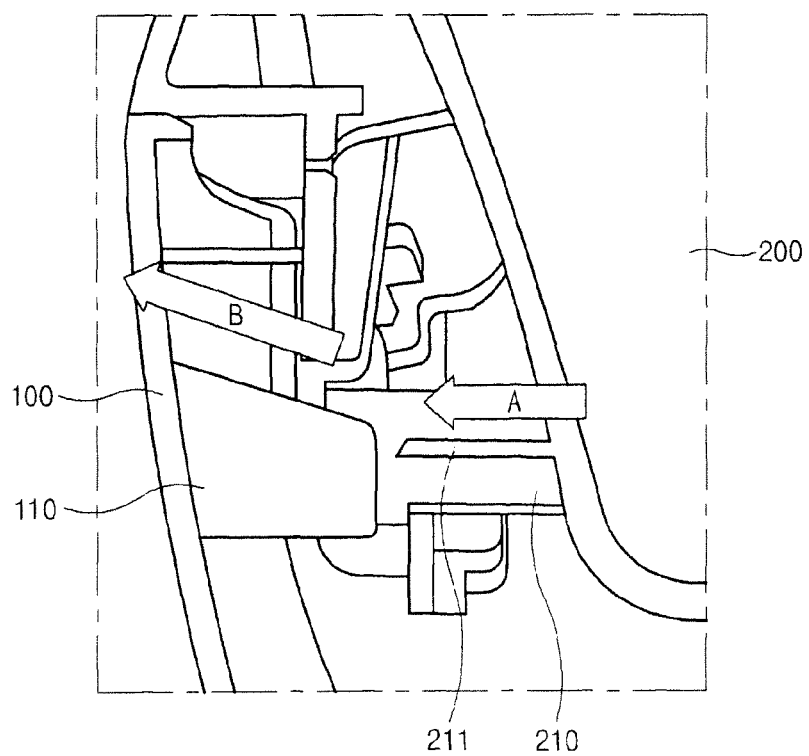
FIG. 5 is a diagram showing a load transfer of the connecting device of the door trim and the pull handle for the vehicle according to the embodiment of the present disclosure.

As a result, the sliding back prevention boss 110 formed at the door trim 100 and the supporting boss 210 formed at the pull handle 200 mounted on the door trim 100 as shown in FIG. 5, may be configured such that the load A transferred from the outside at the time of the collision may be supported by the first supporting rib 111 of the sliding back prevention boss 110 and the second supporting rib 211 of the supporting boss 210 and the intrusion load B is minimized by a coupled structure of the sliding back prevention boss 110 and the supporting boss 210 in the case in which the load of the force exceeding the first supporting rib 111 and the second supporting rib 211 is transferred. As a result of this configuration, it may be possible to minimize the collision energy and decrease the generation of the sharp edge to thereby prevent the generation of the damage to the passenger.

According to an embodiment of the present disclosure, the phenomenon in which sharp edges are generated due to a broadside collision of a vehicle may be prevented and the collision energy due to the collision may be decreased, thereby making it possible to improve salability and safety for the passenger.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the following claims.

What is claimed is:

1. A connecting device of a door trim and a pull handle for a vehicle, the connecting device comprising:
    a sliding back prevention boss configured to protrude from the door trim of the vehicle;
    a supporting boss configured to protrude from the pull handle mounted on the door trim and to be inserted into the sliding back prevention boss;
    a guide groove provided at a lower end of the sliding back prevention boss; and
    a guide rib corresponding to the guide groove provided at a lower end of the supporting boss, the guide rib protruding outward from the supporting boss,
    wherein the sliding back prevention boss has a pair of first supporting ribs on the outer surface thereof, which protrude radially outward in opposite directions from the sliding back prevention boss, and the supporting boss has a pair of second supporting ribs on the outer surface thereof, which protrude radially outward in opposite directions from the supporting boss, and wherein a lower part of the supporting boss is provided with a collision absorbing hole.

2. The connecting device according to claim 1, wherein the sliding back prevention boss has a semi-cylindrical shape and the supporting boss has a cylindrical shape having a diameter smaller than a diameter of the sliding back prevention boss.

3. The connecting device according to claim 1, wherein top surfaces of the sliding back prevention boss are inclined upward toward the door trim of the vehicle.

4. The connecting device according to claim 1, wherein a front surface of the guide rib of the supporting boss has a curved shape.

5. The connecting device according to claim 1, wherein the collision absorbing hole has a cross-section formed in a quadrangle structure.

* * * * *